(12) United States Patent
Chen et al.

(10) Patent No.: US 11,881,690 B2
(45) Date of Patent: Jan. 23, 2024

(54) INSULATING COATING DEVICE FOR ELECTRIC WIRE

(71) Applicant: STATE GRID HUZHOU POWER SUPPLY COMPANY, Huzhou Zhejiang (CN)

(72) Inventors: Zhen Chen, Huzhou Zhejiang (CN); Jing Xu, Huzhou Zhejiang (CN); Wenhui Xu, Huzhou Zhejiang (CN); Weixun Qin, Huzhou Zhejiang (CN); Yongsheng Xu, Huzhou Zhejiang (CN); Zhen Wang, Huzhou Zhejiang (CN); Liupei Wei, Huzhou Zhejiang (CN); Feng Zhou, Huzhou Zhejiang (CN); Xinlong Wu, Huzhou Zhejiang (CN); Xiaobin Shen, Huzhou Zhejiang (CN); Jie Chai, Huzhou Zhejiang (CN); Meng Tang, Huzhou Zhejiang (CN); Kai Shen, Huzhou Zhejiang (CN)

(73) Assignee: STATE GRID HUZHOU POWER SUPPLY COMPANY, Huzhou Zhejiang (CN)

( * ) Notice: Subject to any disclaimer, the term of this patent is extended or adjusted under 35 U.S.C. 154(b) by 520 days.

(21) Appl. No.: 17/145,256

(22) Filed: Jan. 8, 2021

(65) Prior Publication Data
US 2021/0407709 A1 Dec. 30, 2021

(30) Foreign Application Priority Data

Jun. 30, 2020 (CN) .......................... 202010622175.1
Jun. 30, 2020 (CN) .......................... 202021255492.6

(51) Int. Cl.
*H02G 1/14* (2006.01)
*B29C 45/14* (2006.01)
(Continued)

(52) U.S. Cl.
CPC ............. *H02G 1/145* (2013.01); *B29C 33/50* (2013.01); *B29C 45/14549* (2013.01);
(Continued)

(58) Field of Classification Search
CPC .. B29C 2045/14557; B29C 2045/1786; B29C 45/14549; B29C 45/14639; B29C 33/50;
(Continued)

(56) References Cited

U.S. PATENT DOCUMENTS 1,996,565 A * 4/1935 Boeh ...................... H02G 1/145
174/92
3,880,557 A * 4/1975 Nelson ................... H01B 13/103
425/802
(Continued)

FOREIGN PATENT DOCUMENTS

CN 210935560 U * 7/2020 ......... B05B 12/1472
DE 3518654 C2 * 12/1994 ........... H02G 15/113
(Continued)

OTHER PUBLICATIONS

Machine translation of DE 19646005 A1, May 4, 1998 (Year: 1998).*

*Primary Examiner* — Benjamin A Schiffman
(74) *Attorney, Agent, or Firm* — Hunton Andrews Kurth LLP

(57) ABSTRACT

Provided is an insulating coating device for an electric wire, including a pressing pipe. The pressing pipe includes two first pressing parts which are configured to divide the pressing pipe into two parts along a longitudinal cross section of the pressing pipe, an inner wall of the pressing pipe is provided with an air bag, and the air bag is provided with an air pipe joint which penetrates to an outside of the pressing pipe. In the insulating coating device for the electric wire, a self-curing insulating material is coated on joints of
(Continued)

the electric wires, the air bag is used to squeeze the self-curing insulating material such that the self-curing insulating material is shaped and compacted, so that cavities generated in a coating process is reduced, and the self-curing insulating material is uniformly attached to the joints of the electric wires.

9 Claims, 6 Drawing Sheets

(51) Int. Cl.
*H02G 1/16* (2006.01)
*H02G 1/02* (2006.01)
*H02G 1/12* (2006.01)
*B29C 33/50* (2006.01)
*H01B 13/06* (2006.01)
*B29C 43/36* (2006.01)

(52) U.S. Cl.
CPC ......... *B29C 45/14639* (2013.01); *H02G 1/02* (2013.01); *H02G 1/1248* (2013.01); *H02G 1/1297* (2013.01); *H02G 1/14* (2013.01); *H02G 1/16* (2013.01); *B29C 2043/3649* (2013.01); *B29C 2043/3652* (2013.01); *B29C 2045/14557* (2013.01); *H01B 13/06* (2013.01)

(58) Field of Classification Search
CPC ........ B29C 43/3642; B29C 2043/3649; H02G 1/145
See application file for complete search history.

(56) References Cited

U.S. PATENT DOCUMENTS

| | | | | |
|---|---|---|---|---|
| 3,970,735 | A * | 7/1976 | Nelson | H01B 13/103 264/272.13 |
| 4,091,062 | A * | 5/1978 | Nelson | B29C 45/14549 264/327 |
| 4,145,176 | A * | 3/1979 | Nelson | B29C 73/00 249/90 |
| 4,222,801 | A * | 9/1980 | Gold | H02G 15/003 174/76 |
| 11,476,648 | B2 * | 10/2022 | Wang | H02G 1/1265 |
| 11,677,218 | B2 * | 6/2023 | Wang | H02G 1/1265 83/870 |
| 2008/0187274 | A1 * | 8/2008 | Carlson | C08J 5/121 385/100 |
| 2009/0152746 | A1 * | 6/2009 | Wells | B29C 45/14549 425/588 |
| 2016/0089823 | A1 * | 3/2016 | Ikeda | B29C 45/2669 264/272.13 |
| 2021/0376583 | A1 * | 12/2021 | Wang | H01B 7/20 |
| 2021/0399460 | A1 * | 12/2021 | Yoshino | B29C 45/14639 |
| 2022/0102928 | A1 * | 3/2022 | Fiedler | B29C 45/14639 |
| 2022/0134617 | A1 * | 5/2022 | Wenzel | B29C 45/14549 264/259 |

FOREIGN PATENT DOCUMENTS

| | | | | |
|---|---|---|---|---|
| DE | 19646005 | A1 * | 5/1998 | ............. H02G 1/145 |
| EP | 977333 | A1 * | 2/2000 | ............. H02G 1/145 |
| JP | 2004072861 | A  * | 3/2004 | |
| JP | 2014107896 | A  * | 6/2014 | |
| KR | 910001321 | B1 * | 3/1991 | |
| WO | WO-2007143598 | A2 * | 12/2007 | ............. H02G 15/18 |

* cited by examiner

INSULATING COATING DEVICE FOR ELECTRIC WIRE

CROSS-REFERENCE TO RELATED APPLICATION(S)

This application claims priority to Chinese Patent Application No. 202010622175.1 filed Jun. 30, 2020 and Chinese Patent Application No. 202021255492.6 filed Jun. 30, 2020, the disclosures of which are incorporated herein by reference in their entireties.

TECHNICAL FIELD

The present disclosure relates to the technical field of an electric wire insulating coating device, in particular, an insulating coating device for an electric wire.

BACKGROUND

In a distribution network operation such as installing a TTU and replacing a low tension switch without a power cut, in order to ensure that users do not lose power, a bypass often needs to be established to perform the distribution network operation. In a process of establishing the bypass, inevitably, insulation of an original line is removed partially; at the same time, new intermediate joints will be created. After relevant operations are completed, insulation restoration of the removed partial insulation part and the intermediate joints is required. In the related art, the removed partial insulation part and the intermediate joints are winded by using an insulated rubber tape, and then are protected by adding an insulating shell. However, the insulated rubber tape has a low winding efficiency and poor durability, and a construction quality is uncontrollable due to excessive depending of operation experience of a worker; and meanwhile, thick insulating gloves affects the operation, so a construction effect is unable to be guaranteed.

SUMMARY

In view of this, an object of the present disclosure is to provide an insulating coating device for an electric wire to solve the problem in the related art that the winding efficiency is low, the construction quality is uncontrollable, the operation experience of a worker is over-relied on and a construction effect is unable to be guaranteed.

Based on the above-mentioned object, the present disclosure provides an insulating coating device for an electric wire. The insulating coating device for the electric wire includes a pressing pipe, the pressing pipe includes two first pressing parts which are configured to divide the pressing pipe into two parts along a longitudinal cross section of the pressing pipe, an inner wall of the pressing pipe is provided with an air bag, and the air bag is provided with an air pipe joint which penetrates to an outside of the pressing pipe.

In one embodiment, the insulating coating device for the electric wire further includes a filling pipe which is approximately C-shaped, where an outer ring and an inner ring of the filling pipe are provided with a plurality of filling holes, and one side of the filling pipe is provided with a connecting pipe which is connected to an interior of the filling pipe.

In one embodiment, an air pump, a material storage box and a delivery pump are fixed to a bottom surface of the pressing pipe, an input end of the delivery pump is connected to the material storage box through a first pipeline, an output end of the delivery pump is detachably connected to one end of the connecting pipe through a second pipeline, and an output end of the air pump is detachably connected to the air pipe joint through a hose.

In one embodiment, the insulating coating device for the electric wire further includes a circular pipe, where the circular pipe includes two second pressing parts which are configured to divide the circular pipe into two parts along a longitudinal cross section of the circular pipe, the air bag is detachably connected to the inner wall of the pressing pipe, the air bag is detachably connected to an inner wall of the circular pipe, the circular pipe is provided with a through hole for the air pipe joint to protrude, a cross section of the pressing pipe is square-frame-shaped, an inner top and an inner bottom of the pressing pipe each are provided with an arc groove, and the circular pipe is capable of being snapped into two arc grooves of the pressing pipe.

In one embodiment, a fixed frame is disposed between two ends of the pressing pipe, the fixed frame is sleeved with a sliding block, a clamping ring is fixed to the sliding block, a second threaded pin is threadedly connected to a side surface of the sliding block, and a bottom of the second threaded pin is abutted against the fixed frame.

In one embodiment, a rectangular box is disposed a top of the pressing pipe and arranged along a length direction of the pressing pipe, the rectangular box is a long-strip hollow box body, two bearings are fixed to two ends inside the rectangular box, respectively, inner rings of the two bearings are sleeved with a screw, one end inside the rectangular box is provided with a motor, an output shaft of the motor is fixedly connected to one end of the screw, the screw is threadedly connected to a slide base, a top end of the slide base is provided with a connecting rod parallel to a length direction of the screw, the slide base is fixedly connected to a first end of the connecting rod, a second end of the connecting rod penetrates through an end of the rectangular box to an outside of the rectangular box, the second end of the connecting rod is sleeved and fixed with a connecting block, one end of the connecting pipe is configured to pass through a lower part of the connecting block, a first threaded pin is threadedly connected to a side surface of the connecting block, and a bottom of the first threaded pin is abutted against the connecting pipe.

In one embodiment, the filling pipe is a metal bellow.

In one embodiment, the bottom surface of the pressing pipe is further provided with a heating box, a heating wire is disposed inside the heating box, the output end of the air pump is connected to an interior of the heating box through a hose, and the heating box is detachably connected to the air pipe joint through a hose.

In one embodiment, one end of the filling pipe is hinged with a resistor, a first electrode of the resistor is connected to the one end of the filling pipe, a second electrode of the resistor is connected to an alarm, the alarm is connected to a sleeving pipe, where the second electrode of the resistor is connected to one electrode of the alarm, and another electrode of the alarm is connected to the sleeving pipe.

In one embodiment, the inner wall of the pressing pipe is provided with a second hook and loop fastener main surface, one surface of the air bag is provided with a hook and loop fastener sub-surface fitted with the second hook and loop fastener main surface, the inner wall of the circular pipe is provided with a first hook and loop fastener main surface fitted with the hook and loop fastener sub-surface, and another surface of the air bag is provided with a release coating.

It can be seen from the above description, in the insulating coating device for the electric wire of the present disclosure, a self-curing insulating material is coated on joints of the electric wires, the air bag is used to squeeze the self-curing insulating material such that the self-curing insulating material is shaped and compacted, so that cavities generated in a coating process is reduced, and the self-curing insulating material is uniformly attached to the joints of the electric wires. Compared with a manner in which multiple circles of insulated rubber tapes are winded manually, the operation in the present disclosure is simple and efficient without depending on working experience of a worker, thereby improving the construction quality.

BRIEF DESCRIPTION OF DRAWINGS

To illustrate one or more embodiments in the specification or the technical solutions in the related art more clearly, drawings used in the description of the embodiments or the related art will be briefly described below. Apparently, the drawings described below merely illustrate part of one or more embodiments in the specification, and those ordinary skilled in the art may obtain other drawings based on the drawings described below on the premise that no creative work is done.

Figure 1:
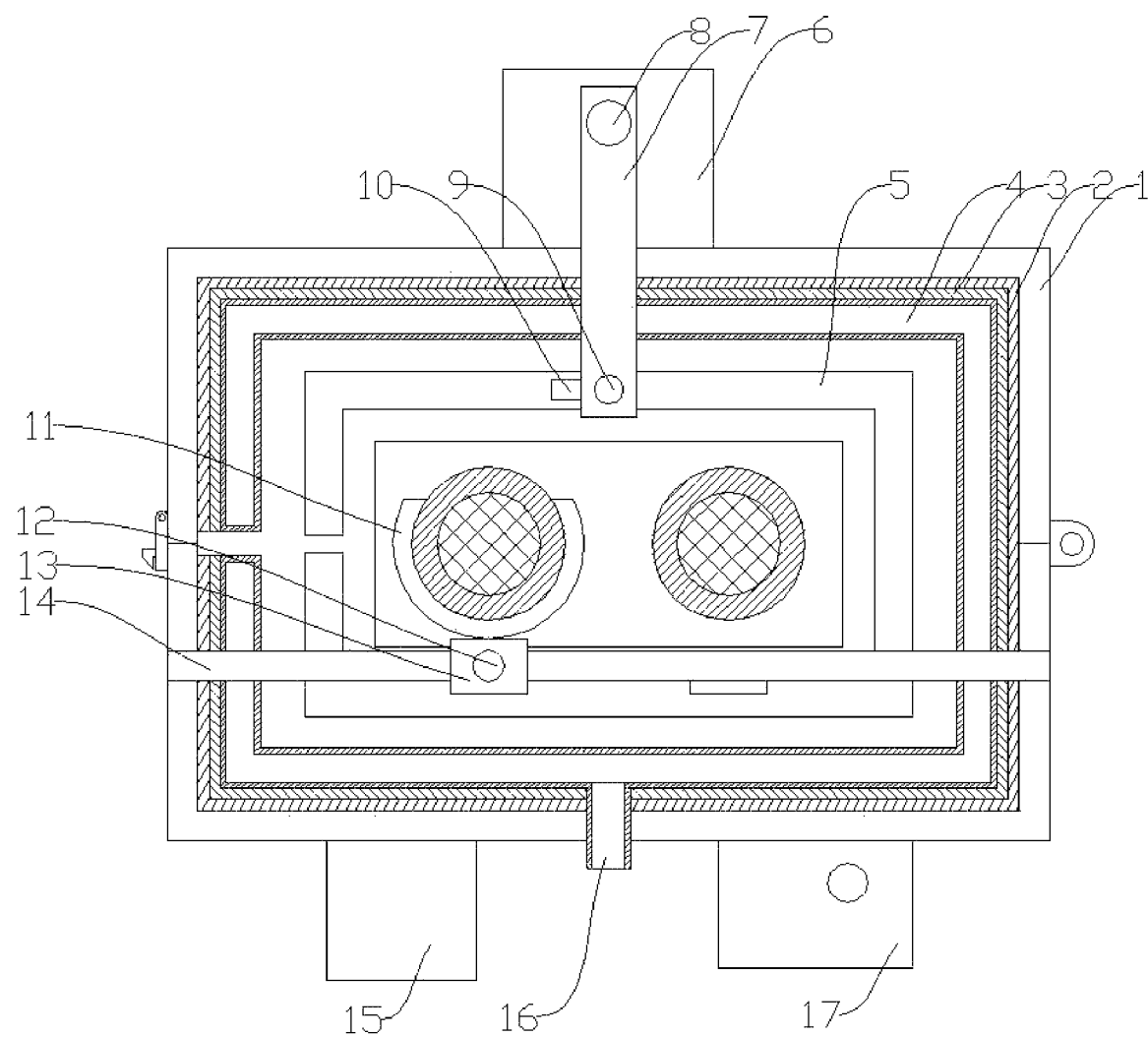
FIG. 1 is a structural schematic diagram illustrating an insulating coating device according to an embodiment of the present disclosure.

In the drawings: 1—pressing pipe; 2—hook and loop fastener sub-surface; 3—second hook and loop fastener main surface; 4—air bag; 5—filling pipe; 6—rectangular box; 7—connecting block; 8—connecting rod; 9—connecting pipe; 10—first threaded pin; 11—clamping ring; 12—second threaded pin; 13—sliding block; 14—fixed frame; 15—air pump; 16—air pipe joint; 17—delivery pump; 18—circular pipe; 19—first hook and loop fastener main surface; 20—heating box; 21—material storage box; 22—motor; 23—bearing; 24—screw; 25—slide base; 26—filling hole; 27—sleeving pipe; 28—alarm; 29—resistor; 30—arc groove.

DETAILED DESCRIPTION

The present disclosure will be further described in detail in conjunction with the specific embodiments, from which the object, technical solutions and advantages of the present disclosure will be more apparent.

It is to be noted that unless otherwise defined, the technical terms or scientific terms used in one or more embodiments of the specification shall have a general meaning understood by those with general skills in the field to which the present disclosure belongs. The term "first", "second" and the like in one or more embodiments of the specification are used to distinguish different components but not used to describe any order, quantity or significance. The term "including", "comprising" or the like means that the elements or articles in front of the term cover elements or articles and their equivalents listed in the back of the term, but does not exclude other elements or articles. The term "connect", "connected to" or the like are not limited to physical or mechanical connections, but may include electrical connections, whether it is direct or indirect. "On", "below", "left", "right" and the like are merely utilized to indicate the relative positional relationship, and when the absolute position of the described object is changed, the relative positional relationship may also change accordingly.

As shown in FIG. 1, the present disclosure provides an insulating coating device for an electric wire. The insulating coating device for the electric wire includes a pressing pipe 1, the pressing pipe 1 includes two first pressing parts, and the two first pressing parts are configured to divide the pressing pipe 1 into two parts along a longitudinal cross section of the pressing pipe 1. An inner wall of the pressing pipe 1 is provided with an air bag 4, and the air bag 4 is provided with an air pipe joint 16 which penetrates out of the pressing pipe 1.

Figure 8:
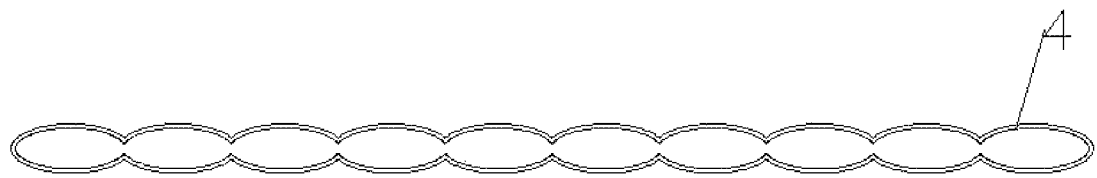
FIG. 8 is a cross-sectional view illustrating an air bag according to the present disclosure.

Two ends of the pressing pipe 1 each have an open structure, and the pressing pipe 1 includes the two first pressing parts which divides the pressing pipe 1 into two parts along the longitudinal cross section of the pressing pipe 1. In one embodiment, the two first pressing parts may be connected in an articulated manner, such that the two first pressing parts can be closed and opened conveniently; and in addition, the two first pressing parts may be locked in a locking manner, such that the two first pressing parts can be closed more firmly and opened conveniently. The inner wall of the pressing pipe 1 is provided with the air bag 4. In one embodiment, the air bag 4 has a rectangular shape when the air bag 4 is tiled. As shown in FIG. 8, the air bag 4 includes a plurality of air bag strips communicated with each other, such that when the air bag 4 is air-inflated, a thickness of each part of the air bag 4 is substantially uniform. The air bag 4 may be fixed on the inner wall of the pressing pipe 1 in an adhesive manner. The air bag 4 is provided with the air pipe joint 16, and the air pipe joint 16 is connected to an inside of the air bag 4 and configured for injecting gas into the inside of the air bag 4, such that the air bag 4 is inflated. The air pipe joint 16 penetrates from an inside of the pressing pipe 1 to an outside of the pressing pipe 1 and is configured to connect an external air source so as to inject air into the inside of the air bag 4. During coating an insulation part of the electric wire, a joint where an insulating layer of the electric wire is peeled off is firstly connected through a connecting piece. In one embodiment, the connecting piece for the electric wire mainly includes a wire clamp and a connecting pipe 9. The wire clamp is used for connecting two electric wires side by side, and the connecting pipe 9 is used for connecting the two electric wires coaxially. A self-curing insulating material is applied to joints of electric wires, such as a 3M256 coating material; then the two first pressing parts of the pressing pipe 1 are opened, the joints of the electric wires are placed between the two first pressing parts, and the two first pressing parts are closed such that the electric wire passes through the pressing pipe 1; and air is injected into the inside of the air bag 4 through the air pipe joint 16 such that the air bag 4 is inflated, and the inflated air bag 4 squeezes the self-curing insulating material wrapped at the joints of the electric wires such that the self-curing insulating material is uniformly compacted and attached to the joints of the electric wires. The self-curing insulating material is compacted by the squeezing of the inflated air bag 4, thereby eliminating cavities formed during the coating process, and avoiding a reduction of a service life of the insulating layer and a risk of cracking due to the cavities in the insulating layer. The air bag 4 presses the self-curing insulating material for a certain period of time and waits for the self-curing insulating material to be cured. After the self-curing insulating material is cured, the two first pressing parts of the pressing pipe 1 are opened, and the joints of the electric wires are taken out from the pressing pipe 1.

In the insulating coating device for the electric wire of the present disclosure, the self-curing insulating material is coated on the joints of the electric wires, the air bag 4 is used to squeeze the self-curing insulating material such that the self-curing insulating material is shaped and compacted, so that cavities generated in the coating process is reduced, and the self-curing insulating material is uniformly attached to the joints of the electric wires. Compared with a manner in which multiple circles of insulated rubber tapes are winded manually, the operation in the present disclosure is simple and efficient without depending on working experience of a worker, thereby improving a construction quality.

Figure 3:
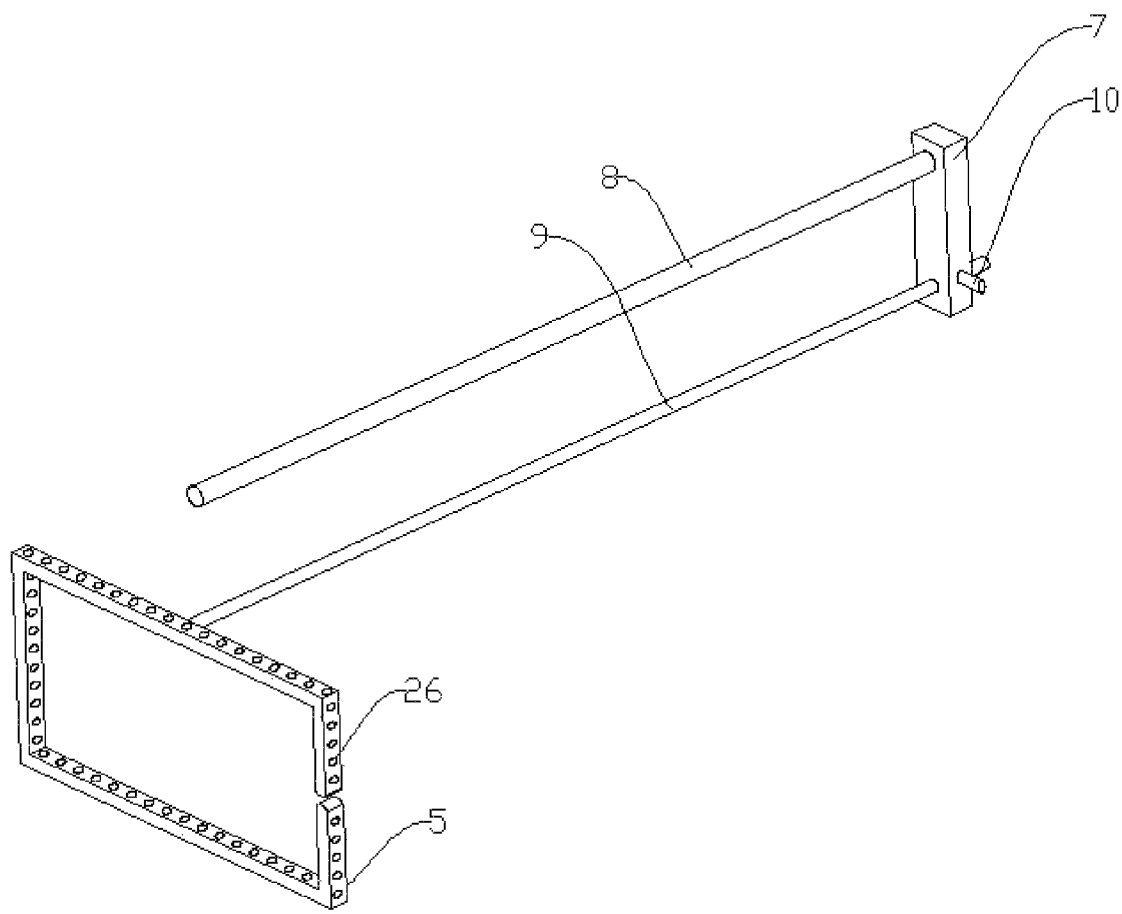
FIG. 3 is a structural schematic diagram illustrating a filling pipe according to the present disclosure.

In some embodiments, as shown in FIG. 1 and FIG. 3, the insulating coating device for the electric wire further includes a filling pipe 5 which is approximately C-shaped, where an outer ring and an inner ring of the filling pipe 5 are provided with a plurality of filling holes 26, and one side of the filling pipe 5 is provided with the connecting pipe 9 which is communicated with an interior of the filling pipe 5.

In one embodiment, the filling pipe 5 is approximately C-shaped, and the filling pipe 5 may adopt a pipe having a certain elasticity, such as a PE pipe. The filling pipe 5 is C-shaped, an opening of the filling pipe 5 is provided as small as possible such that the filling pipe 5 is approximately in the shape of a closed frame, and a reserved opening allows the electric wire to snap into the inside of the filling pipe 5. The self-curing insulating material may be injected into the inside of the filling pipe 5 through the connecting pipe 9, and the plurality of filling holes 26 are disposed on the inner ring and the outer ring of the filling pipe 5, so that the self-curing insulating material can flow out of the filling holes 26. During coating the self-curing insulating material, the joints of the electric wires are placed inside the pressing pipe 1, then the filling pipe 5 is sleeved on the joints of the electric wires, the connecting pipe 9 is grasped such that the filling pipe 5 is moved to inside of the pressing pipe 1 and to one end of a region to be coated; and the self-curing insulating material is injected into the filling pipe 5, and the filling pipe 5 is slowly moved along the region to be coated. The filling pipe 5 is provided with the plurality of filling holes 26, and the self-curing insulating material flows out of the filling holes 26 and uniformly coats a periphery of the joints of the electric wires, thereby reducing cavities generated during the coating process and improving quality of a coated insulating layer.

Figure 5:
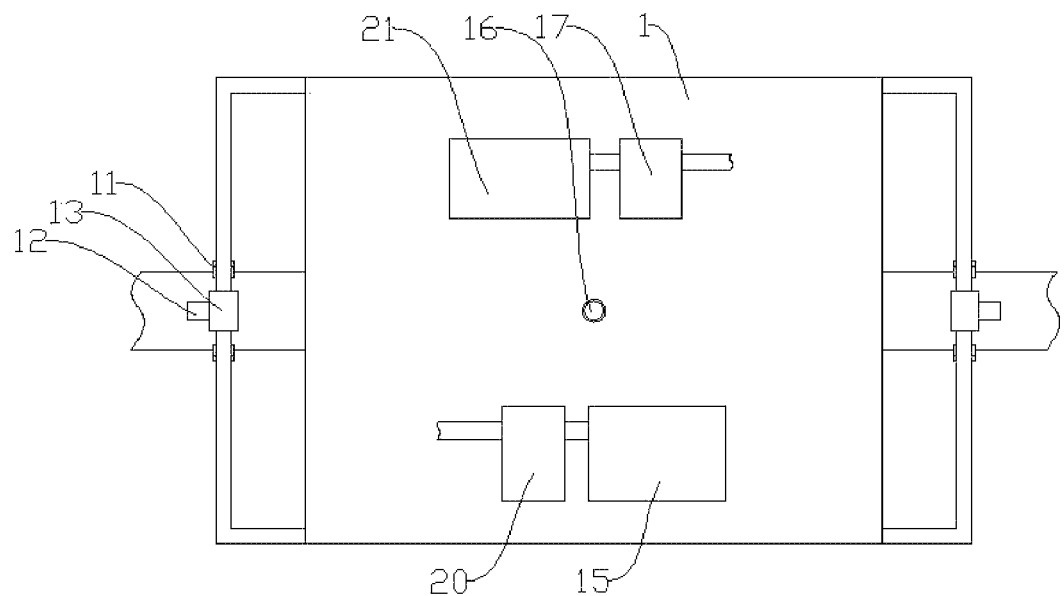
FIG. 5 is a structural schematic diagram illustrating a bottom surface of a pressing pipe of an insulating coating device according to the present disclosure.

In some embodiments, as shown in FIG. 5, an air pump 15, a material storage box 21 and a delivery pump 17 are fixed to a bottom surface of the pressing pipe 1, an input end of the delivery pump 17 is connected to the material storage box 21 through a first pipeline, an output end of the delivery pump 17 is detachably connected to an end of the connecting pipe 9 through a second pipeline, and an output end of the air pump 15 is detachably connected to the air pipe joint 16 through a hose.

In one embodiment, the self-curing insulating material is stored in the material storage box 21. When an insulating coating is performed on the joints of the electric wires, air is injected into the air bag 4 through the air pump 15 such that the air bag 4 is inflated, and the self-curing insulating material in the material storage box 21 is delivered to the connecting pipe 9 through the delivery pump 17.

Figure 2:
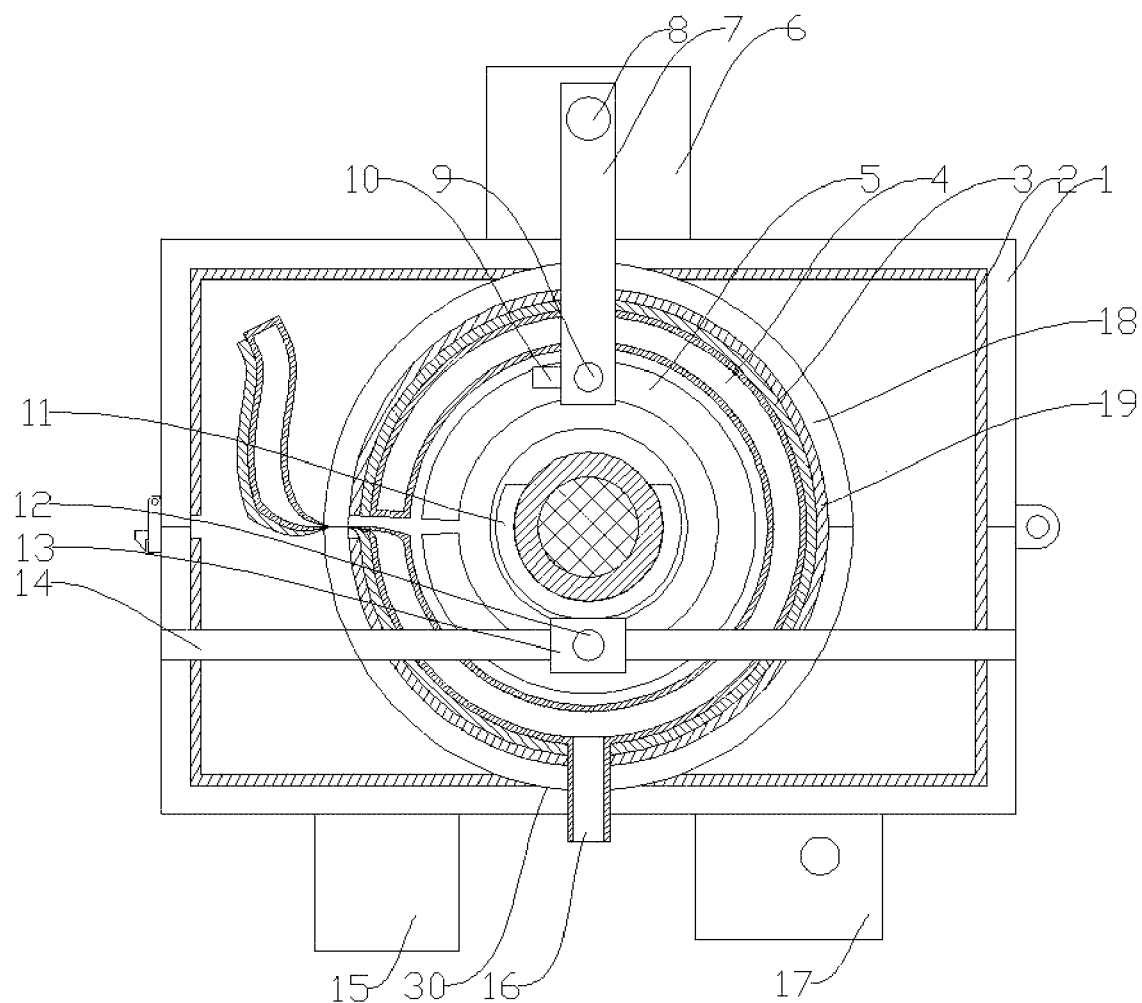
FIG. 2 is a structural schematic diagram illustrating an insulating coating device according to another embodiment of the present disclosure.

In some embodiments, as shown in FIG. 2, the insulating coating device for the electric wire further includes a circular pipe 18, where the circular pipe 18 includes two second pressing parts, and the two second pressing parts are configured to divide the circular pipe 18 into two parts along a longitudinal cross section of the circular pipe 18. The air bag 4 is detachably connected to the inner wall of the pressing pipe 1, and the air bag 4 is detachably connected to an inner wall of the circular pipe 18. The circular pipe 18 is provided with a through hole for the air pipe joint 16 to protrude. A cross section of the pressing pipe 1 has a square frame shape. An inner top and an inner bottom of the pressing pipe 1 each are provided with an arc groove 30, and the circular pipe 18 is capable of being snapped into two arc grooves 30 of the pressing pipe 1.

Figure 9:
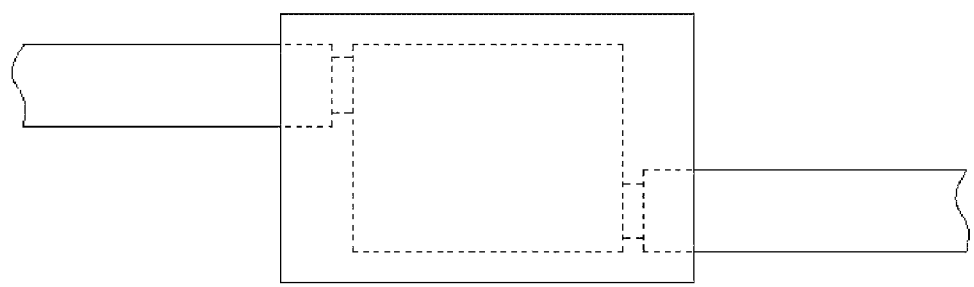
FIG. 9 is a schematic diagram illustrating electric wires connected by a wire clamp.

As shown in FIG. 9, joints of two electric wires are clamped side by side through the wire clamp. A cross section of the wire clamp has a rectangle shape, and the pressing pipe 1 has a square frame shape corresponding to the wire clamp. In one embodiment, the pressing pipe 1 has a same length-width ratio as the wire clamp. In this way, during coating the joints of two electric wires, a center of the pressing pipe 1 is aligned with a center of the wire clamp, such that a filled self-curing insulating material is also in a rectangular shape and has a same insulation thickness at each position, thereby sufficiently improving an effective utilization rate of the self-curing insulating material on a premise of ensuring an insulation property.

Figure 10:
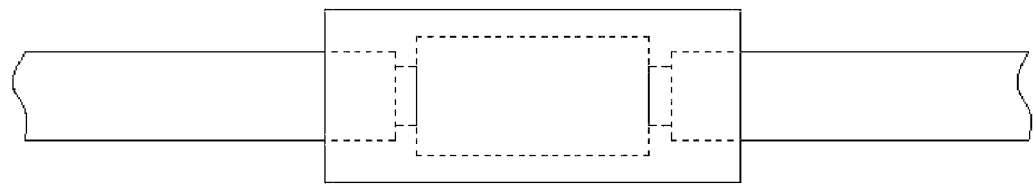
FIG. 10 is a schematic diagram illustrating electric wires coaxially connected to each other.

As shown in FIG. 10, the two electric wires may further be coaxially connected to each other, the two second pressing parts may be connected in an articulated manner and closed in a snap-on manner, and the air bag 4 are detachably connected to the inner wall of the pressing pipe 1 and the inner wall of the circular pipe 18. In one embodiment, the air bag 4 may be connected to the inner wall of the pressing pipe 1 and the inner wall of the circular pipe 18 in an adhesive manner, respectively. For two wires connected coaxially, the air bag 4 is removed from the inner wall of the pressing pipe 1 and mounted on the inner wall of the circular pipe 18, and after the air bag 4 covers the inner wall of the circular pipe 18 for one turn, and an excess part of the air bag 4 may protrude from a seam of the two second pressing parts. The circular pipe 18 is provided with a through hole such that the air pipe joint 16 of the air bag 4 can protrude from the through hole. The two second pressing parts are opened, and the joints of the electric wires are placed therein. In this way, the air bag 4 can compress the coated insulating layer into a circle when the air bag 4 expands, such that the thickness of the insulating layer is uniform.

The inner top and the inner bottom of the pressing pipe 1 each are provided with the arc groove 30, and the arc grooves 30 of the pressing pipe 1 are fitted with an arc surface of the circular pipe 18, such that the circular pipe 18 can be snapped into the two arc grooves 30.

Figure 4:
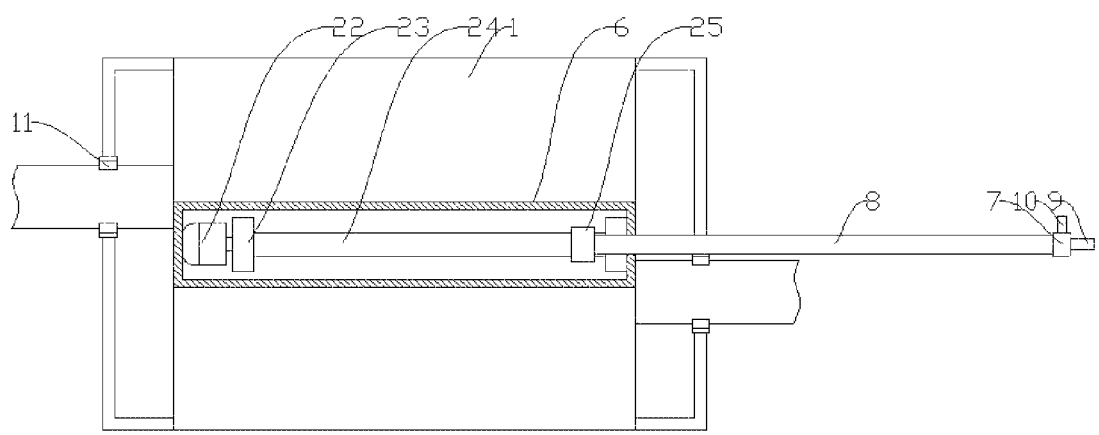
FIG. 4 is a structural schematic diagram illustrating a top surface of a pressing pipe of an insulating coating device according to the present disclosure.

In some embodiments, as shown in FIG. 1, FIG. 4 and FIG. 5, a fixed frame 14 is disposed between two ends of the pressing pipe 1, and the fixed frame 14 is sleeved with a sliding block 13. A clamping ring 11 is fixed to the sliding block 13, a side surface of the sliding block 13 is provided with a second threaded pin 12 threadedly connected to the side surface of the sliding block 13, and a bottom of the second threaded pin 12 is abutted against the fixed frame 14.

The sliding block 13 is slideable along the fixed frame 14 so as to adjust a position of the clamping ring 11. The second threaded pin 12 is used to lock the sliding block 13 on the fixed frame 14 so as to fix a position of the sliding block 13. The pressing pipe 1 is connected to the fixed frame 14 in a clamping or bolting manner. In operation, if two electric wires are connected through the wire clamp and centers of the two electric wires at two ends of the wire clamp are staggered, the sliding block 13 is moved such that positions of two clamping rings 11 are symmetrical with respect to a central axis of the pressing pipe 1; and the two clamping rings 11 are clamped on the two electric wires at two ends of the joints of the electric wires, respectively, such that the pressing pipe 1 can be fixed, thus facilitating the worker to release one hand for other operations. Moreover, positions of the two clamping rings 11 correspond to the two electric wires at the two ends of the joints of the electric wires, such that the pressing pipe is positioned and the center of the pressing pipe 1 coincides with the center of the wire clamp, therefore the thickness of the filled insulating layer is uniform.

During coating the joints of the electric wires coaxially connected to each other, the sliding block 13 is moved such that the two clamping rings 11 are moved to a central axis in a length direction of the pressing pipe 1; and the pressing pipe 1 is clamped on the joints of the electric wires by the two clamping rings 11, the circular pipe 18 is sleeved on the joints of the electric wires and snapped into the arc grooves 30 such that a center of the circular pipe 18 and a center of the joints of the electric wires coincide with each other. In this way, during filling the self-curing insulating material, a filling thickness is uniform, thereby improving an effective utilization rate of the self-curing insulating material; and the position of the clamping ring 11 is adjustable, such that the clamping ring 11 is suitable for electric wires in different connection forms.

In some embodiments, as shown in FIG. 4, a rectangular box 6 is disposed at atop the pressing pipe 1 and arranged along the length direction of the pressing pipe 1, and the rectangular box 6 is a long-strip hollow box body. Two ends inside the rectangular box 6 each are fixed with a bearing 23, and inner rings of two bearings 23 of the rectangular box 6 are sleeved with a screw 24. One end inside the rectangular box 6 is provided with a motor 22, an output shaft of the motor 22 is fixedly connected to one end of the screw 24. The screw 24 is provided with a slide base 25 threadedly connected to the screw 24. A top end of the slide base 25 is provided with a connecting rod 8 parallel to a length direction of the screw 24. The slide base 25 is fixedly connected to a first end of the connecting rod 8, a second end of the connecting rod 8 penetrates through an end of the rectangular box 6 to an outside of the rectangular box 6, and the second end of the connecting rod 8 is sleeved and fixed with a connecting block 7. One end of the connecting pipe 9 is configured to pass through a lower part of the connecting block 7. A side surface of the connecting block 7 is provided with a first threaded pin 10 threadedly connected to the side surface of the connecting block 7, and a bottom of the first threaded pin 10 is abutted against the connecting pipe 9.

In one embodiment, the rectangular box 6 may be fixed to an upper end outside the pressing pipe 1 in a bolted connection manner and the rectangular box 6 is the long-strip hollow box body. The respective bearings 23 may be fixed at two ends inside the rectangular box 6 in a welding manner. Two ends of the screw 24 are interference fitted with the inner rings of the two bearings 23, respectively. The motor 22 is fixed to one end inside the rectangular box 6 in a bolted connection manner. The output shaft of the motor 22 may be connected to the screw 24 through a coupler, and the motor 22 drives the screw 24 to rotate. The motor 22 may be powered by a dry battery, a lithium battery or a storage battery, which is not repeated herein. The screw 24 is provided with the slide base 25 threadedly connected to the screw 24, and when the screw 24 rotates, the slide base 25 moves linearly along the screw 24. The first end of the connecting rod 8 may be fixed to the slide base 25 in the bolted connection manner or the welding manner, the second end of the connecting rod 8 penetrates from the end of the rectangular box 6 to the outside of the rectangular box 6, and the second end of the connecting rod 8 is fixed with the connecting block 7. One end of the connecting pipe 9 is configured to pass through the lower part of the connecting block 7, the side surface of the connecting block 7 is provided with the first threaded pin 10 threadedly connected to the side surface of the connecting block 7, and the bottom of the first threaded pin 10 is abutted against the connecting pipe 9. During filling the self-curing insulating material, the filling pipe 5 is delivered to one end of the region to be coated through the connecting pipe 9; then the connecting pipe 9 is inserted into the bottom of the connecting block 7 and the connecting pipe 9 is locked and fixed through the first threaded pin 10; and the self-curing insulating material is delivered to the connecting pipe 9 through the delivery pump 17 and enters the filling pipe 5 through the connecting pipe 9, and then flows out through the filling holes 26 of the inner ring and the outer ring of the filling pipe 5. In a filling process, the motor 22 drives the screw 24 to rotate, and drives the slide base 25 to move along the length direction of the pressing pipe 1, the slide base 25 drives the connecting rod 8 to move synchronously, and the connecting rod 8 clamps the connecting pipe 9 through a metal clamp and drives the connecting pipe 9 to move along the length direction of the pressing pipe 1, such that the filling pipe 5 moves along the region to be coated. The motor 22 drives the screw 24 to rotate at a constant speed, such that the slide base 25 and the connecting rod 8 are kept rotating at a constant speed, and further the filling pipe 5 passes through the region to be coated at a constant speed. In this way, a coating uniformity of the self-curing insulating material during filling is further improved, and meanwhile manual operations are reduced, so that not only the efficiency is high, but also hands of a worker can be far away from the electric wire and an operation risk is reduced.

In some embodiments, the filling pipe 5 is a metal bellow, and the metal bellow has stretch properties, bending properties and certain holding power. During coating the joints of the electric wires clamped by the wire clamp, the filling pipe 5 is bent into a rectangle shape. During coating the joints of the electric wires coaxially connected to each other, the filling pipe 5 is bent into a helix shape. In this way, a shape of the filling pipe 5 may be adjusted according to different types of joints of the electric wires, which is convenient for uniform filling of the self-curing insulating material.

Figure 6:
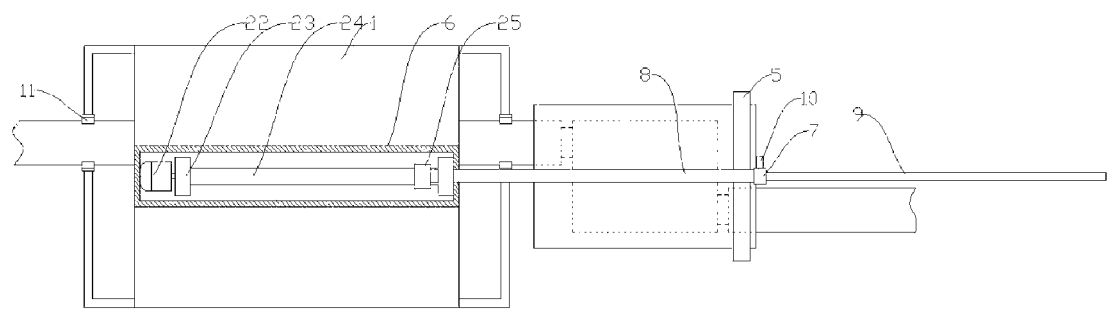
FIG. 6 is a schematic diagram illustrating an insulating coating device performing drying or detecting according to the present disclosure.

In some embodiments, as shown in FIG. 5 and FIG. 6, the bottom surface of the pressing pipe 1 is further provided with a heating box 20, and a heating wire is disposed inside the heating box 20. The output end of the air pump 15 is connected to an interior of the heating box 20 through a hose, and the heating box 20 is detachably connected to the air pipe joint 16 through a hose.

After the self-curing insulating material is compacted and shaped by the air bag 4, the pressing pipe 1 is opened and moved from an insulating coating region to an electric wire at one end, the two clamping rings 11 are both fixed to the electric wire at the one end, and the filling pipe 5 is stretched and a length of the filling pipe 5 is increased, such that the insulating coating region can be accommodated inside the filling pipe 5. The heating wire in the heating box 20 is energized, the hose of the heating box 20 is removed from the air pipe joint 16 and mounted to an end of the connecting pipe 9. Air output from the air pump 15 is heated by the heating wire, delivered to the connecting pipe 9, and then ejected from the filling holes 26 in the filling pipe 5. The motor 22 turns on and drives the screw 24 to rotate, the screw 24 drives the connecting rod 8 to move synchronously through the slide base 25, and the connecting rod 8 drives the connecting pipe 9 to move through the connecting block 7, such that the filling pipe 5 moves along the insulating coating region. In the movement process, the hot air ejected from the filling pipe 5 dries the insulating coating material, accelerates an internal curing of the coating self-curing insulating material, and improves a curing efficiency.

Figure 7:
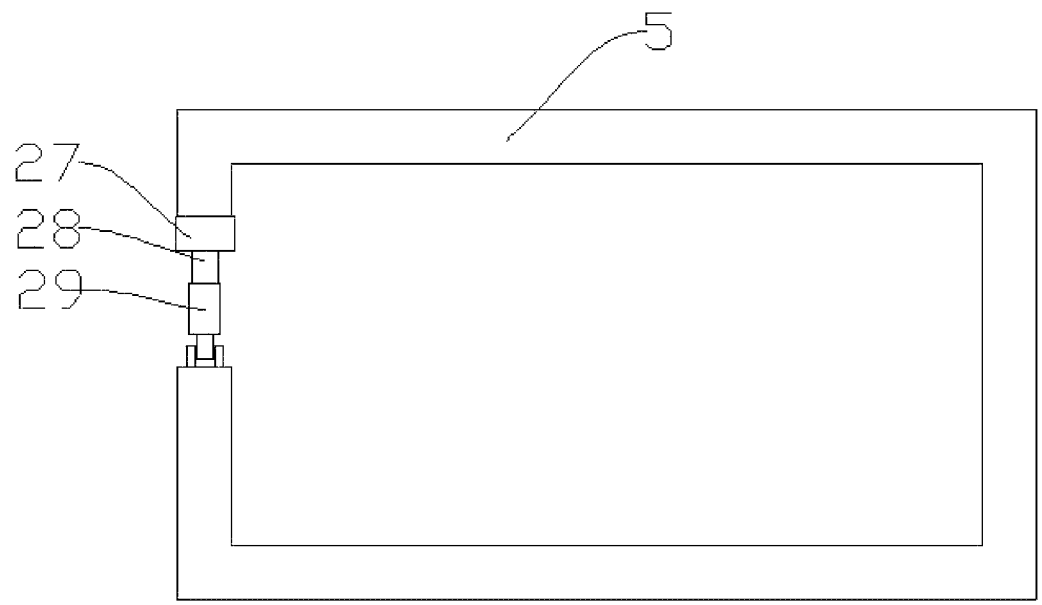
FIG. 7 is a structural schematic diagram illustrating a filling pipe performing detecting according to the present disclosure.

In some embodiments, as shown in FIG. 6 and FIG. 7, one end of the filling pipe 5 is hinged with a resistor 29, and a first electrode of the resistor 29 is connected to the one end of the filling pipe 5. A second electrode of the resistor 29 is connected to an alarm 28, and the alarm 28 is connected to a sleeving pipe 27. The second electrode of the resistor 29 is connected to one electrode of the alarm 28, and another electrode of the alarm 28 is connected to the sleeving pipe 27.

The resistor 29 is hinged to the end of the filling pipe 5 through a metal hinged shaft, and the resistor 29, the alarm 28 and the sleeving pipe 27 may be connected to each other in an adhesive manner. After the self-curing insulating material is completely cured, the pressing pipe 1 is opened and moved from the insulating coating region to the electric wire at the one end, the two clamping rings 11 are both fixed to the electric wire at the one end, and the filling pipe 5 is stretched and the length of the filling pipe 5 is increased, such that the insulating coating region can be accommodated inside the filling pipe 5. For the joints of the electric wires connected by the wire clamp, the filling pipe 5 is bent into a rectangular frame shape such that the filling pipe 5 is attached to an outside of a square insulating coating region. For the joints of the electric wires coaxially connected to each other, the filling pipe 5 is compressed and bent into an annular shape, such that the filling pipe 5 is attached to an outside of a circular insulating coating region. The resistor 29 is rotated, and the other end of the filling pipe 5 is inserted into the sleeving pipe 27, such that the filling pipe 5, the sleeving pipe 27, the resistor 29 and the alarm 28 form a closed-loop circuit. The motor 22 turns on and drives the screw 24 to rotate, the screw 24 drives the connecting rod 8 to move synchronously through the slide base 25, and the connecting rod 8 drives the connecting pipe 9 to move through the connecting block 7, such that the filling pipe 5 moves along the insulating coating region. In the movement process, if the insulating coating region has a defect, a current will be directed to the filling pipe 5 through an internal guide line, and the resistor 29 is used to carry a relatively large current. When the current is introduced into the closed-loop circuit formed by the alarm 28, the alarm 28 is energized and sends out an alarm message. In one embodiment, the alarm 28 may use a light alarm or a buzzer. If a worker receives the alarm message, it indicates that the insulating coating region has a quality problem and needs to be recoated; otherwise, it indicates that the insulating coating region is of good quality and satisfies applicable requirements.

In some embodiments, the inner wall of the pressing pipe 1 is provided with a second hook and loop fastener main surface 3, one surface of the air bag 4 is provided with a hook and loop fastener sub-surface 2 fitted with the second hook and loop fastener main surface 3, and the inner wall of the circular pipe 18 is provided with a first hook and loop fastener main surface 19 fitted with the hook and loop fastener sub-surface 2, which is convenient to fix the air bag 4 to the inner wall of the pressing pipe 1 or the inner wall of the circular pipe 18. The other surface of the air bag 4 is provided with a release coating. In this way, after the self-curing insulating material is cured, the air bag 4 can be relative-easily detached from the insulating layer.

The above describes specific embodiments of the present specification. Other embodiments are within the scope of the appended claims. In some cases, the actions or steps recorded in the claims may be performed in a different order than in the embodiments and the desired results may still be achieved. In addition, the processes depicted in the drawings do not necessarily require a shown specific order or successive order to achieve the desired results. In some embodiments, multitasking and parallel processing are also possible or may be advantageous.

Those of ordinary skill in the art will understand that the discussion of any one of the above embodiments is merely exemplary and is not intended to imply that the scope of the present disclosure (including the claims) is limited to these examples. Under the thought of the present disclosure, the above-mentioned embodiments or the technical features in different embodiments may also be combined, the steps may be implemented in any order, and there are many other variations of the various aspects of one or more embodiments of the present specification as described above, which are not provided in detail for the sake of brevity.

In addition, in order to simplify the description and discussion and not to make one or more embodiments of the present specification difficult to understand, well-known power/ground connections to integrated circuit (IC) chips and other components may or may not be shown in the provided drawings. Furthermore, the device may be shown in the form of a block diagram, so as to avoid making one or more embodiments of the present specification difficult to understand, and the following fact is also taken into account, that is, the details regarding the embodiments of the block diagram devices are highly dependent on the platform on which one or more embodiments of the present specification will be implemented (that is, the details should be fully within the understanding of those skilled in the art). With specific details (such as a circuit) set forth to describe exemplary embodiments of the present disclosure, it will be apparent to those skilled in the art that one or more embodiments of the present specification may be implemented without the specific details or with variations in the specific details. Therefore, these descriptions should be considered illustrative rather than restrictive.

Although the present disclosure has been described in conjunction with specific embodiments, many substitutions, modifications, and variations of these embodiments will become apparent to those of ordinary skill in the art from the foregoing description. For example, other memory architectures (such as a dynamic RAM (DRAM)) may use the embodiments that are discussed.

One or more embodiments of the specification are intended to cover all such substitutions, modifications, and variations that fall within the broad scope of the appended claims. Therefore, any omissions, modifications, equivalent substitutions, improvements and the like made within the spirit and principle of one or more embodiments of the specification are within the scope of the present disclosure.

What is claimed is:

1. An insulating coating device for an electric wire, comprising:
a pressing pipe, wherein the pressing pipe comprises two first pressing parts which are configured to divide the pressing pipe into two parts along a longitudinal cross section of the pressing pipe, an inner wall of the pressing pipe is provided with an air bag, and the air bag is provided with an air pipe joint which penetrates to an outside of the pressing pipe; and
a filling pipe which is approximately C-shaped, wherein an outer ring and an inner ring of the filling pipe are provided with a plurality of filling holes, and one side of the filling pipe is provided with a connecting pipe which is connected to an interior of the filling pipe.

2. The insulating coating device for the electric wire of claim 1, wherein an air pump, a material storage box and a delivery pump are fixed to a bottom surface of the pressing pipe, an input end of the delivery pump is connected to the material storage box through a first pipeline, an output end of the delivery pump is detachably connected to one end of the connecting pipe through a second pipeline, and an output end of the air pump is detachably connected to the air pipe joint through a hose.

3. The insulating coating device for the electric wire of claim 2, further comprising a circular pipe, wherein the circular pipe comprises two second pressing parts which are configured to divide the circular pipe into two parts along a longitudinal cross section of the circular pipe, the air bag is detachably connected to the inner wall of the pressing pipe, the air bag is detachably connected to an inner wall of the circular pipe, the circular pipe is provided with a through hole for the air pipe joint to protrude, a cross section of the pressing pipe is square-frame-shaped, an inner top and an inner bottom of the pressing pipe each are provided with an arc groove, and the circular pipe is capable of being snapped into two arc grooves of the pressing pipe.

4. The insulating coating device for the electric wire of claim 3, wherein a fixed frame is disposed between two ends of the pressing pipe, the fixed frame is sleeved with a sliding block, a clamping ring is fixed to the sliding block, a first threaded pin is threadedly connected to a side surface of the sliding block, and a bottom of a second threaded pin is abutted against the fixed frame.

5. The insulating coating device for the electric wire of claim 4, wherein a rectangular box is disposed a top of the pressing pipe and arranged along a length direction of the pressing pipe, the rectangular box is a long-strip hollow box body, two bearings are fixed to two ends inside the rectangular box, respectively, inner rings of the two bearings are sleeved with a screw, one end inside the rectangular box is provided with a motor, an output shaft of the motor is fixedly connected to one end of the screw, the screw is threadedly connected to a slide base, a top end of the slide base is provided with a connecting rod parallel to a length direction of the screw, the slide base is fixedly connected to a first end of the connecting rod, a second end of the connecting rod penetrates through an end of the rectangular box to an outside of the rectangular box, the second end of the connecting rod is sleeved and fixed with a connecting block, one end of the connecting pipe is configured to pass through a lower part of the connecting block, the second threaded pin is threadedly connected to a side surface of the connecting block, and a bottom of the first threaded pin is abutted against the connecting pipe.

6. The insulating coating device for the electric wire of claim 5, wherein the filling pipe is a metal bellow.

7. The insulating coating device for the electric wire of claim 6, wherein the bottom surface of the pressing pipe is further provided with a heating box, a heating wire is disposed inside the heating box, the output end of the air pump is connected to an interior of the heating box through a hose, and the heating box is detachably connected to the air pipe joint through a hose.

8. The insulating coating device for the electric wire of claim 6, wherein one end of the filling pipe is hinged with a resistor, a first electrode of the resistor is connected to the one end of the filling pipe, a second electrode of the resistor is connected to an alarm, the alarm is connected to a sleeving pipe, wherein the second electrode of the resistor is connected to one electrode of the alarm, and another electrode of the alarm is connected to the sleeving pipe.

9. The insulating coating device for the electric wire of claim 3, wherein the inner wall of the pressing pipe is provided with a second hook and loop fastener main surface, one surface of the air bag is provided with a hook and loop fastener sub-surface fitted with the second hook and loop fastener main surface, the inner wall of the circular pipe is provided with a first hook and loop fastener main surface fitted with the hook and loop fastener sub-surface, and another surface of the air bag is provided with a release coating.

* * * * *